United States Patent

Hayashi et al.

[11] Patent Number: 5,498,851
[45] Date of Patent: Mar. 12, 1996

[54] LASER MACHINING APPARATUS AND METHOD

[75] Inventors: Eikichi Hayashi; Ryuichi Fujimoto, both of Aichi, Japan

[73] Assignee: Mitsubishi Denki Kabushiki Kaisha, Tokyo, Japan

[21] Appl. No.: 110,969

[22] Filed: Aug. 24, 1993

[30] Foreign Application Priority Data

Aug. 27, 1992 [JP] Japan .................................. 4-228550
Jul. 26, 1993 [JP] Japan .................................. 5-183940

[51] Int. Cl.$^6$ .................................................. B23K 26/06
[52] U.S. Cl. .............................. 219/121.7; 219/121.75; 219/121.77
[58] Field of Search ........................... 219/121.61, 121.7, 219/121.71, 121.73, 121.74, 121.75, 121.72, 121.77; 427/596

[56] References Cited

U.S. PATENT DOCUMENTS

| | | | |
|---|---|---|---|
| 3,586,816 | 6/1971 | Hagen | 219/121.75 |
| 3,720,213 | 3/1973 | Hobart et al. | 219/121.73 |
| 4,275,288 | 6/1981 | Makosch et al. | 219/121.75 |
| 4,315,130 | 2/1982 | Inagaki et al. | 219/121.77 |
| 4,467,168 | 8/1984 | Morgan et al. | 219/121.72 |
| 4,553,017 | 11/1985 | Addleman . | |
| 4,566,453 | 1/1986 | Kumano et al. | 219/121.77 |
| 4,691,093 | 9/1987 | Banas et al. | 219/121.74 |
| 5,055,653 | 10/1991 | Funami et al. | 219/121.75 |
| 5,103,073 | 4/1992 | Danilov et al. | 219/121.7 |
| 5,210,390 | 5/1993 | Okumoto | 219/121.7 |
| 5,237,150 | 8/1993 | Karube | 219/121.72 |
| 5,352,495 | 10/1994 | Henderson et al. | 427/596 |
| 5,362,940 | 11/1994 | MacDonald et al. | 219/121.73 |

FOREIGN PATENT DOCUMENTS

| | | | |
|---|---|---|---|
| 4024299 | 2/1992 | Germany . | |
| 51-128794 | 11/1976 | Japan . | |
| 55-42200 | 3/1980 | Japan . | |
| 56-50795 | 5/1981 | Japan | 219/121.77 |
| 57-68288 | 4/1982 | Japan . | |
| 58-9784 | 1/1983 | Japan . | |
| 3-180290 | 8/1991 | Japan . | |
| 4182088 | 6/1992 | Japan . | |
| 4-356392 | 12/1992 | Japan | 219/121.6 |

*Primary Examiner*—Geoffrey S. Evans
*Attorney, Agent, or Firm*—Sughrue, Mion, Zinn, Macpeak & Seas; Richard C. Turner; Steven M. Gruskin

[57] ABSTRACT

A pulse laser beam of energy distribution having a plurality of peaks is generated (e.g. having a $TEM_{01}$ mode or greater) and is directed onto an optical system. The system combines beam-condensing optical elements and multi-beam-splitting prism elements so that the peaks of energy distribution in the laser beam mode fall correspondingly on the cut surfaces of each of the multi-beam-splitting prism elements. Each of the condensing and splitting elements may either be of transmission or reflection type, and further they may be of separate or integral type. Fresnel lenses or meniscus lenses may be used as beam-condensing optical elements. As a result, a plurality of pulse laser beam-condensed spots are produced.

41 Claims, 8 Drawing Sheets

$d \simeq 2(n-1)\alpha f$

LASER MACHINING APPARATUS AND METHOD

BACKGROUND OF THE INVENTION

1. Field of the Invention

The present invention relates to an apparatus for machining holes in a workpiece by using plural condensed laser beams.

2. Description of the Background

A conventional apparatus employs condensed pulsed laser beams to make very small air circulation holes in filter wrapping paper. Such apparatus is disclosed in Japanese Patent Disclosure Publication No. 42200 of 1980, Japanese Patent Disclosure Publication No. 9784 of 1983 and Japanese Patent Disclosure Publication No. 180290 of 1991. Also well known is an apparatus which uses condensed pulsed laser beams to make very small holes in order to make the packing materials of fabrics or food, seasonings, etc., breathable and ensure ease of unpacking.

Such apparatuses known in the art generally make a string of holes in a band-shaped material by condensing and applying pulsed laser beams to the material as the material moves at high speed.

FIG. 12 is a diagram showing the arrangement of a laser cutting apparatus known in the art. FIG. 13 illustrates the changes of pulsed laser beam output in relation to time, and FIGS. 14a and 14b comprise a laser beam condensing status diagram, showing top and side views.

Referring to these drawings, the numeral 1 indicates laser oscillator, 2 denotes a pulsed laser beam, 3 represents a beam splitter, 4 indicates bend mirrors, 5 designates condenser lenses, 6 is a band-shaped material, 7 denotes transfer rollers, 8 represents beam-condensed spots, and 9 shows holes made in the material 6. In FIG. 14b, 10 indicates a space energy distribution of the pulsed laser beam. FIG. 14b shows energy distribution in a single mode, i.e., Gaussian distribution having a single peak.

The operation of the conventional apparatus will now be described with reference to these drawings. The output of the pulsed laser beam 2 from the laser oscillator 1 is an intermittent, approximately rectangular wave as shown in FIG. 13. There are a wide variety of pulsing methods that are well known in the art, e.g., a method wherein the exciting action itself of laser oscillation is pulsed and a method wherein continuous oscillation is mechanically chopped to create pulses, and therefore these methods will not be detailed here. The pulsed laser beam 2 is divided by the beam splitter 3 and directed along separate paths. In a case as shown in FIG. 12, beam 2 is divided into four quarters and the four pulsed outputs are deflected by the corresponding bend mirrors 4 and fall on the corresponding lenses 5. The pulsed laser beams impinging on the lenses 5 are condensed and form beam-condensed spots 8 on the bend-shaped material 6. Meanwhile, the bend-shaped material 6 or a workpiece is transferred by the rollers 7 in the direction of the arrow and the strings of holes are made in the band-shaped material 6 at intervals determined by the laser beam pulse frequency and the moving speed of the band-shaped material 6.

Where higher productivity is desired, the moving speed can be increased but the pulsed light must operate at a higher frequency if closely spaced holes are desired. One suggested approach is to divide the beam after it passes through the condenser lens 5, by using a beam-splitting prism lens (not shown). FIG. 15 illustrates output contour lines that are generated when such a beam-splitting prism lens is employed under the lens 5 in FIG. 12 to split the pulsed laser beam having single-mode energy distribution in the laser cutting apparatus shown in FIG. 12. As illustrated, when the single-mode laser beam is split by the prism lens, fringes 13a, 13b are produced on the workpiece by diffracted light, in addition to the two beam-condensed spots indicated by 8a, 8b. Since the fringes do not contribute to hole making, output loss occurs and hole making speed reduces substantially.

The laser cutting apparatus, which is arranged as described above, may increase the transfer speed of the band-shaped material to enhance production capability. However, such a conventional apparatus may require an increase in the output of the pulse laser beam to shorten the rise and fall times of the output. Consequently, a large laser oscillator is required to increase the laser output, resulting in high price. In addition, there are limitations based on the principles of laser oscillation and on the mechanical structure of the mechanical chopper which produces the pulsed beam that limit the output rise and fall times and the pulse frequency, preventing the improvement of productivity.

SUMMARY OF THE INVENTION

It is, accordingly, an object of the present invention to overcome the disadvantages in the conventional apparatus by providing a laser cutting apparatus and method which greatly enhances productivity without increasing the transfer speed of a band-shaped material.

The present invention achieves a laser cutting apparatus for making holes in a traveling band-shaped material which allows more strings of holes and more holes to be made without increasing the transfer speed of the bend-shaped material, thereby improving production capability.

Specifically, the apparatus and method causes a pulse laser beam of energy distribution having a plurality of peaks to impinge on an optical system. The system combines beam-condensing optical elements and multi-beam-splitting prism elements so that the peaks of energy distribution in the laser beam mode fall correspondingly on the cut surfaces of each of the multi-beam-splitting prism elements. As a result, a plurality of pulse laser beam-condensed spots are produced.

Also, the present invention employs Fresnel lenses or meniscus lenses as beam-condensing optical elements, thereby improving the energy density of the beam-condensed spots.

In addition, the peripheral edge on the prism cut side of each multi-beam-splitting prism lens in the apparatus may be designed to be a flat shape which is orthogonal to an optical axis. With this structure, the optical elements are held stably and reliably and a cooling effect is further improved.

Furthermore, a carbon dioxide gas pulse laser oscillator in a discharge excitation method in the apparatus is designed to oscillate a pulse laser beam in a system wherein a discharge direction, a laser gas flowing direction and a laser oscillating direction are orthogonal to each other. As a result, the apparatus allows strings of holes to be made without increasing the transfer speed of the band-shaped material, and production capability can be enhanced greatly.

Furthermore, the present invention employs a fast axial flow laser oscillator which generates a laser beam whose energy distribution of laser mode has a plurality of peaks.

DESCRIPTION OF THE PREFERRED EMBODIMENTS

An embodiment of the present invention will now be described with reference to FIGS. 1–3 in the appended drawings.

Figure 1:
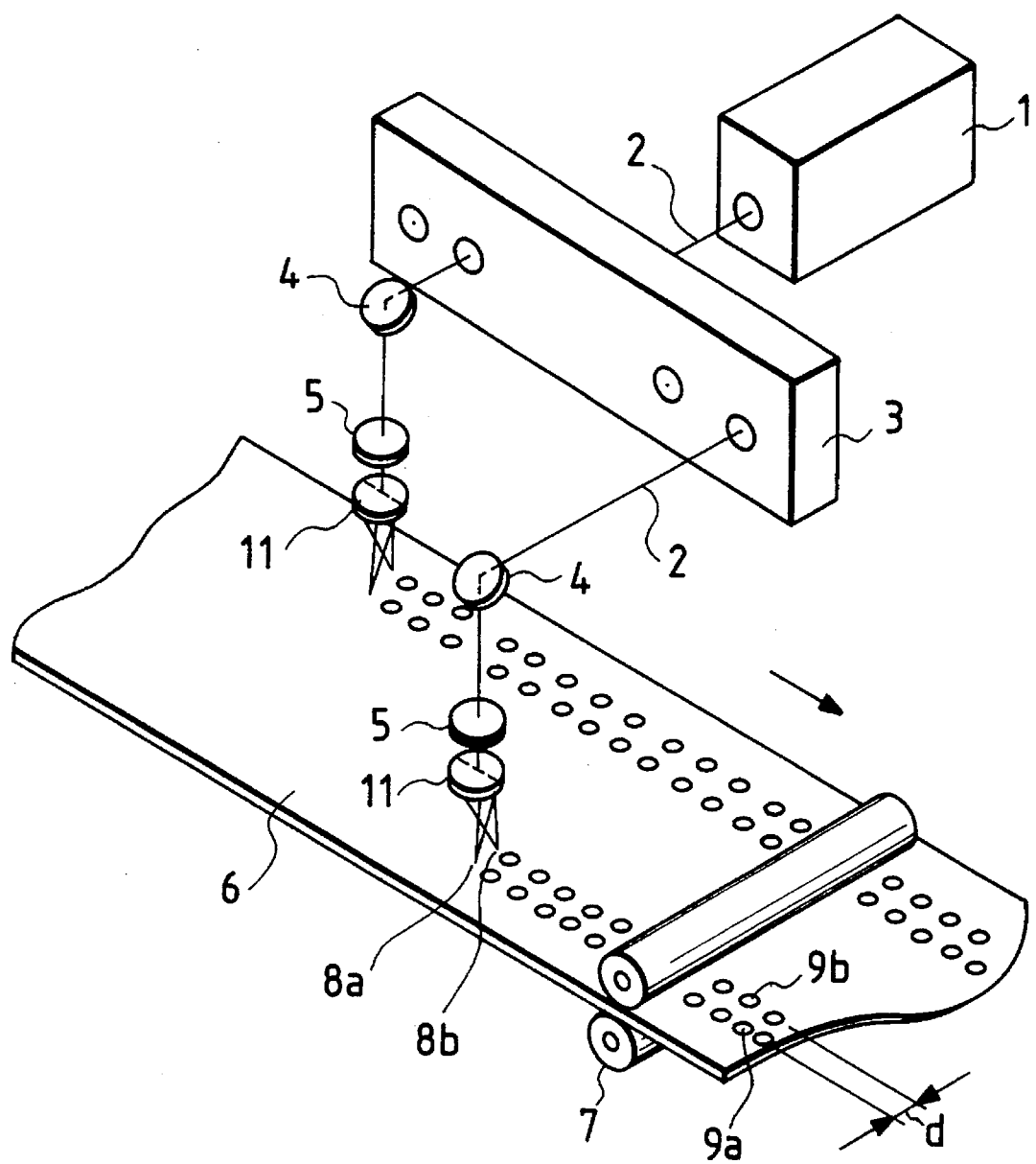
FIG. 1 is a laser cutting apparatus arrangement diagram according to a first embodiment of the invention.
Figure 2:
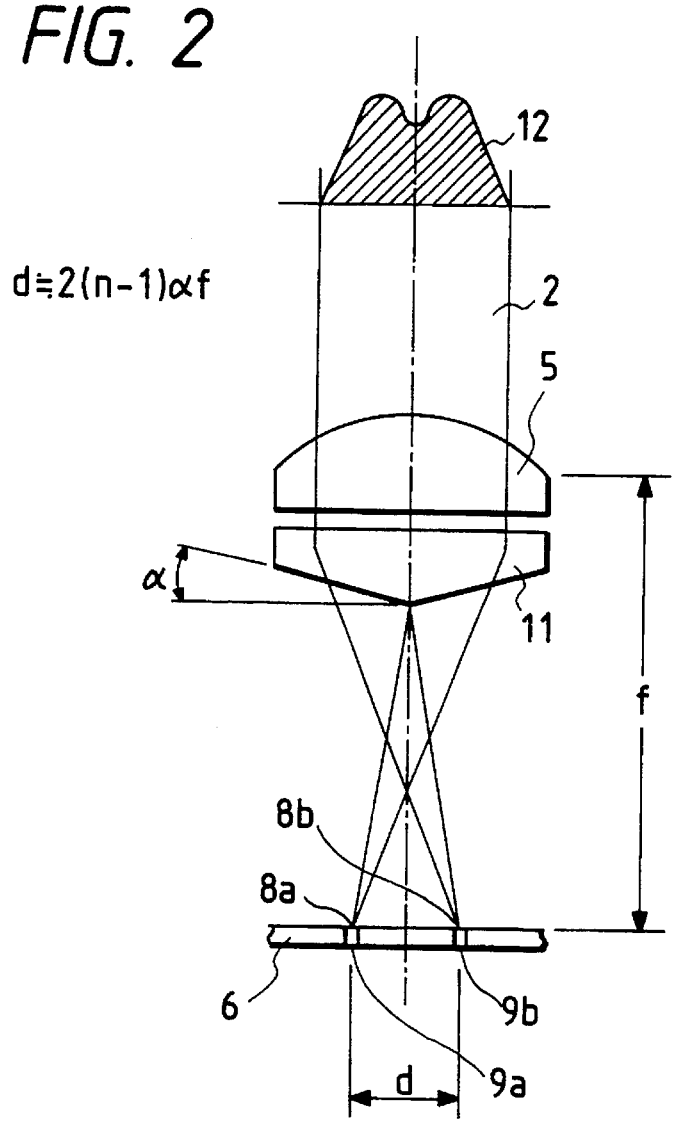
FIG. 2 is a beam-condensing status diagram of a laser beam having two peaks in the apparatus of FIG. 1.
Figure 3:
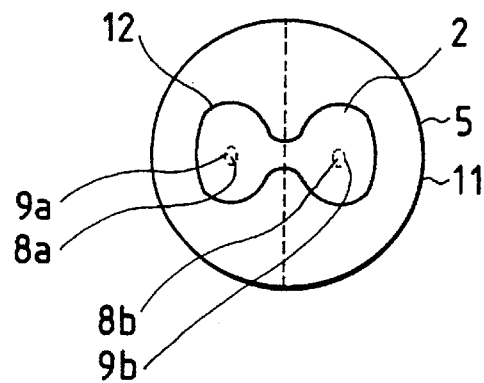
FIG. 3 is a top view of FIG. 2.

FIG. 1 is a laser cutting apparatus arrangement according to the first embodiment of the present invention, FIG. 2 shows the condensed status of a laser beam, and FIG. 3 is a top view of FIG. 2. In these drawings, the numeral 2 indicates a laser beam, 3 indicates a beam splitter, 4 denotes bend mirrors, and 5 designates lenses which are general flat convex lenses in this case. A prism lens 11 is provided adjacent to the bottom of the lenses 5 and has a prism configuration wherein a disc-shaped bottom surface is cut into two mutually intersecting planes and is operative to produce two separate beams. FIG. 2 illustrates a $TEM_{01}$ mode beam wherein the space energy distribution 12 of the pulsed laser beam 2 has two peaks. The generation of a pulsed laser beam with $TEM_{01}$ or other multiple peak distributions is well known in the art. As in the conventional design illustrations, 6 indicates a band-shaped material, 7 denotes transfer rollers, 8a and 8b represent beam-condensed spots, 9a and 9b indicate holes made in the material 6.

The operation of the apparatus according to the present embodiment will now be described with reference to the appended drawings. The pulse laser beam 2 output from the laser oscillator 1 is divided by the beam splitter 3 to make plural beams for use in the simultaneous production of strings of holes. In a case such as shown in FIG. 1, the laser beam 2 may be split into four outputs, each of which is then deflected by a corresponding bend mirror 4 and impinges on a corresponding lens 5. Although only two of the four outputs and their corresponding structures are shown in FIG. 1, the preferred embodiment of the described apparatus uses four outputs and makes up to eight strings of holes simultaneously.

The pulse laser beam 2 provides the $TEM_{01}$-mode energy distribution 12 so that each of the peaks of the energy distribution impinge correspondingly on the two cut surfaces on the bottom of the two-beam-splitting prism lens 11 provided under the lens 5 as shown in FIG. 2. The laser beam is designed to be split into two beams at right angles with the arrow-indicated moving direction of the band-shaped material 6. The beam-condensed spots 8a and 8b are separated by a distance d and produce strings of spots 9a and 9b when the material is moved past the spots as the beams are pulsed. The lens 5 is a beam-condensing optical element and, the two-beam-splitting prism lens 11 is a beam-splitting optical element.

String width d between the beam-condensed spots 8a and 8b and between the holes 9a and 9b produced by beam-condensing and beam-splitting is determined by the expression of $d \approx 2(n-1)\alpha f$, where n is an index of refraction determined by the wavelength of the laser beam and the material of the elements, f is the focal length of the lens 5, and $\alpha$ is the cut surface angle of the beam-splitting prism lens 11. Since the band-shaped material 6 is transferred by the rollers 7 in the direction of the arrow in relation to the beam-condensed spots 8a, 8b, etc., of the pulse laser beam, the strings of holes 9a, 9b, etc., are made in the band-shaped material 6.

Table 1 is a hole making performance-specifications comparison table between the conventional apparatus and the apparatus according to the present invention. As indicated in Table 1, the hole-making speed may be reduced by 20% but the number of bands produced may be doubled since the number strings of holes may be increased and the overall production capability may be improved 1.6 times as compared to that of the conventional apparatus.

TABLE 1

|  | Conventional Apparatus | Apparatus of Present Invention |
|---|---|---|
| Hole-making size (shorter diameter × longer diameter × pitch, mm) | 0.1–0.2 × 0.1–0.2 × 0.5 | ← |
| Number of hole strings | 4 | 8 |
| Number of cutting heads | 4 | 4 |
| Lens specifications | Flat convex lens | Flat convex lens + prism lens |
| Laser mode | $TEM_{00}$ (single mode) | $TEM_{01}$ |
| Laser output (average W) | 37.5/head | 44/head |
| Pulse frequency (kHz) | 5 | 4 |
| Hole-making speed (m/min.) | 150 | 120 |
| Number of bands produced | 1 | 2 |

TABLE 1-continued

|  | Conventional Apparatus | Apparatus of Present Invention |
|---|---|---|
| Speed in terms of productivity (m/min.) | 150 | 240 |

Figure 4A:
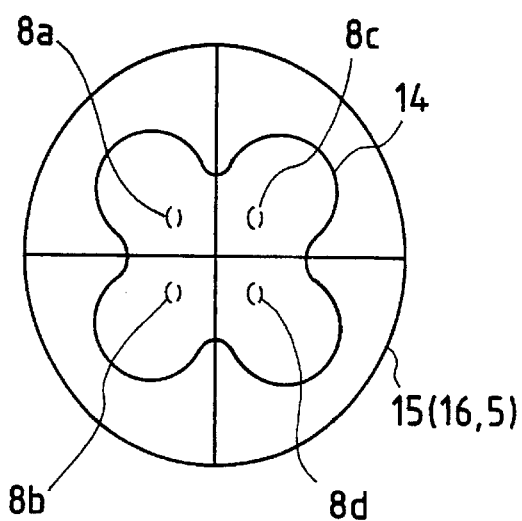
FIGS. 4a and 4b illustrate top and perspective views of a four-beam-splitting/condensing optical element according to a second embodiment of the invention, indicating a relationship between a beam-splitting/condensing optical system and a laser beam mode.
Figure 4B:
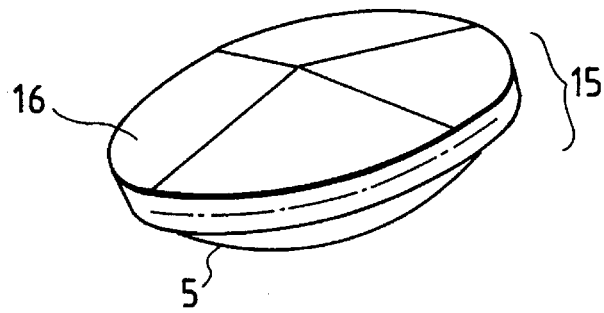

A further embodiment as illustrated in FIGS. 4a and 4b will now be described. The numeral 14 indicates a high-order laser beam mode wherein four peaks of energy distribution exist radially. A beam-splitting/condensing optical system 15 combines a four-beam-splitting prism lens 16 and a flat convex lens 5. The lenses 15 and 16 are shown as an integral part in the figure but may be separate. Also, the system's beam-splitting/condensing sequence and form may be those of the beam-condensing/splitting optical system as shown in FIG. 2. The high-order mode pulse beam 14 having four peaks is applied as shown in the figure so that the peaks impinge correspondingly on the four cut surfaces of the four-beam-splitting prism lens 16, thereby producing four beam-condensed spots 8a, 8b, 8c, 8d of the pulse laser beam. This hole-making apparatus, which allows more strings of holes to be made as compared to the laser beam mode shown in FIGS. 2 and 3, achieves further improvement in hole-making capability.

Figure 5:
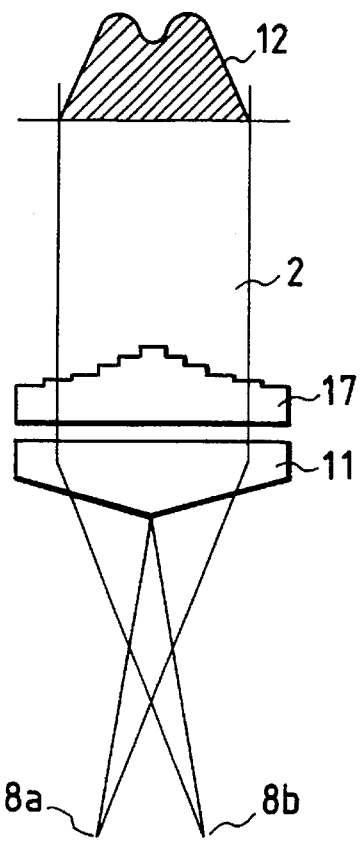
FIG. 5 is a beam-condensing status diagram of a laser beam in another embodiment of the invention.

An arrangement shown in FIG. 5 is similar to that in FIG. 2 but uses a Fresnel lens 17 as a beam-condensing optical element, in place of element 5. The Fresnel lens 17, which has been machined by stages to reduce diffraction loss as it condenses a beam on the basis of the wavelength of the laser beam, improves the beam-condensing characteristic and further enhances the energy density of the beam-condensed spots 8a, 8b. Hence, a laser hole-making apparatus that is operative at higher workpiece transfer speeds can be obtained.

It will be appreciated that the $TEM_{01}$-mode 12 and the two-beam-splitting prism lenses 11 described above may be replaced by a laser beam mode having a plurality of energy distribution peaks and multi-beam-splitting lenses to produce an identical effect.

Figure 6:
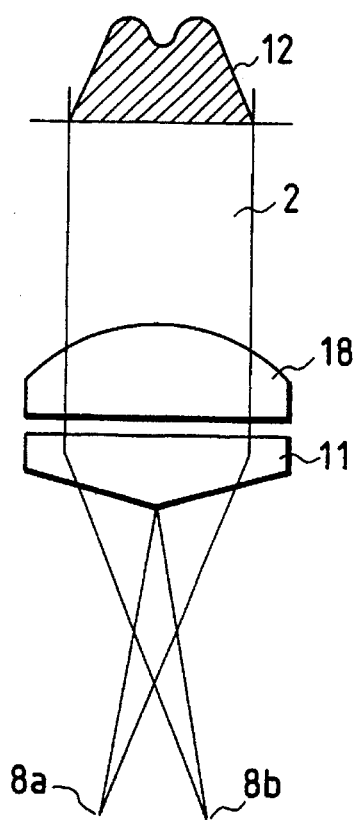
FIG. 6 is a beam-condensing status diagram of a laser beam in another embodiment of the invention.

An arrangement shown in FIG. 6 is similar to that in FIG. 5 but uses a meniscus lens 18 as a beam-condensing optical element. The meniscus lens 18, which has been machined to reduce spherical aberration at the time of its beam condensing, produces the same effect as in FIGS. 5 and 6, i.e., a Fresnel/meniscus lens, would produce a higher effect.

Figure 7:
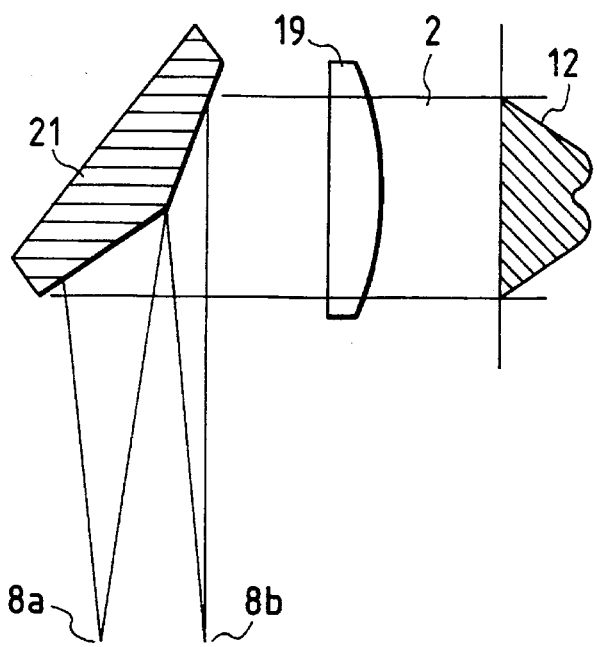
FIG. 7 is a beam-condensing status diagram of a laser beam illustrating a further embodiment of a laser cutting apparatus according to the invention.
Figure 8:
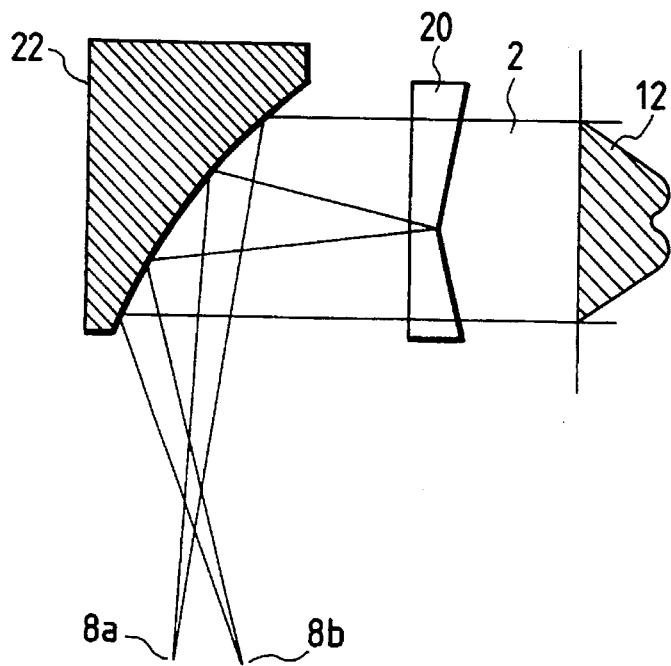
FIG. 8 is a beam-condensing status diagram of a laser beam illustrating an embodiment of the laser cutting apparatus according to the invention.

FIGS. 7 and 8, which show embodiments different from those of the laser hole-making apparatus according to the present invention described above, will now be described. In FIG. 7, there is a transmission type beam-condensing optical element 19 that receives the $TEM_{01}$-mode beam 2 with energy distribution 12 in two peaks and provides a condensed beam to a reflection type beam-splitting prism element 21. FIG. 8 shows a transmission type beam-splitting prism element 20 that receives the beam 2, divides the beam and transmits each beam to a reflection type beam-condensing optical element 22. In each case, the laser pulse of $TEM_{01}$-mode energy distribution 12 is applied so that the peaks of the energy fall correspondingly on the cut surfaces of the multi-beam-splitting prism element, whereby the beam condensing operation of the beam-condensing optical element produces beam-condensed spots 8a, 8b.

While the $TEM_{01}$ mode was employed as the laser beam mode in the present embodiment, corresponding multi-beam-splitting prism elements may be used in a mode having a plurality of energy distribution peaks.

Figure 9:
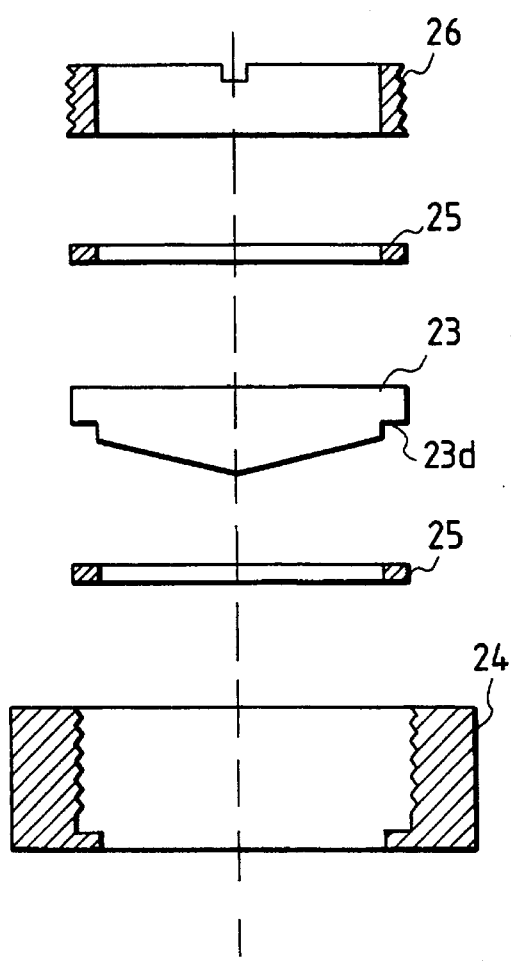
FIG. 9 is a beam-splitting prism lens arrangement diagram illustrating another embodiment of the invention.

FIG. 9, which shows an embodiment of a beam-splitting prism lens used in the present invention, will now be described. 23 indicates a multi-beam-splitting prism lens of a disc shape which has been machined to a flat configuration wherein the prism cut surface-side peripheral edge 23d on the bottom is made orthogonal to the optical axis of the lens, illustrated by the dotted line. The lens mount 24, annular heat-dissipating sheets 25 that are fitted to the top and bottom of the multi-beam-splitting lens 23, and the hold-down screw 26 form part of the assembly. If the cut surface-side peripheral edge is not flat, the disc-shaped prism lens may not be held securely or oriented precisely. Also, due to a small contact area of the lens and the lens mount 24, a lens cooling effect would be low. The present invention overcomes these disadvantages by providing an apparatus which holds the beam-splitting prism lenses securely and accurately and offers high lens cooling efficiency.

As in the embodiment shown in FIGS. 7 and 8, beam condensing and beam splitting may be done in either sequence, each element may either be of transmission or reflection type, and further they may be of separate or integral type.

Figure 10:
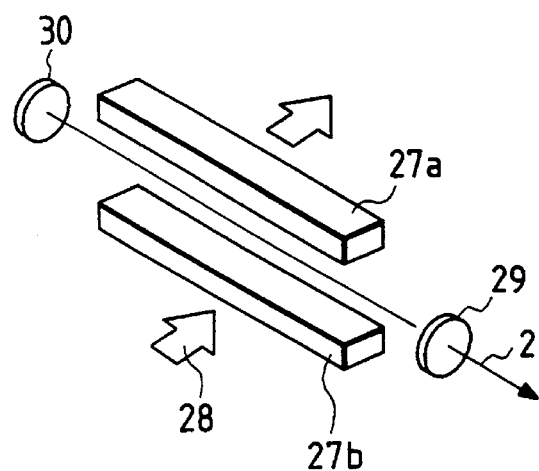
FIG. 10 is a carbon dioxide gas laser oscillator arrangement diagram illustrating yet another embodiment of the invention.
Figure 11:
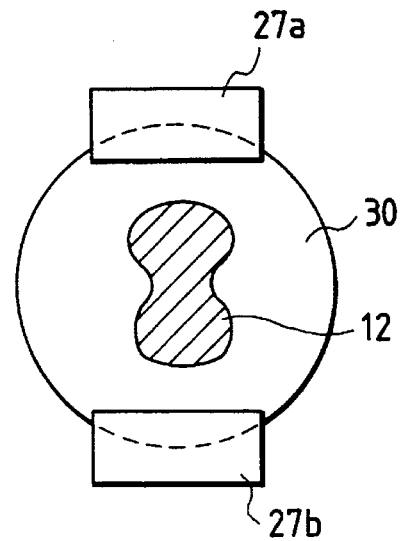
FIG. 11 is a sectional view of FIG. 10.
Figure 12:
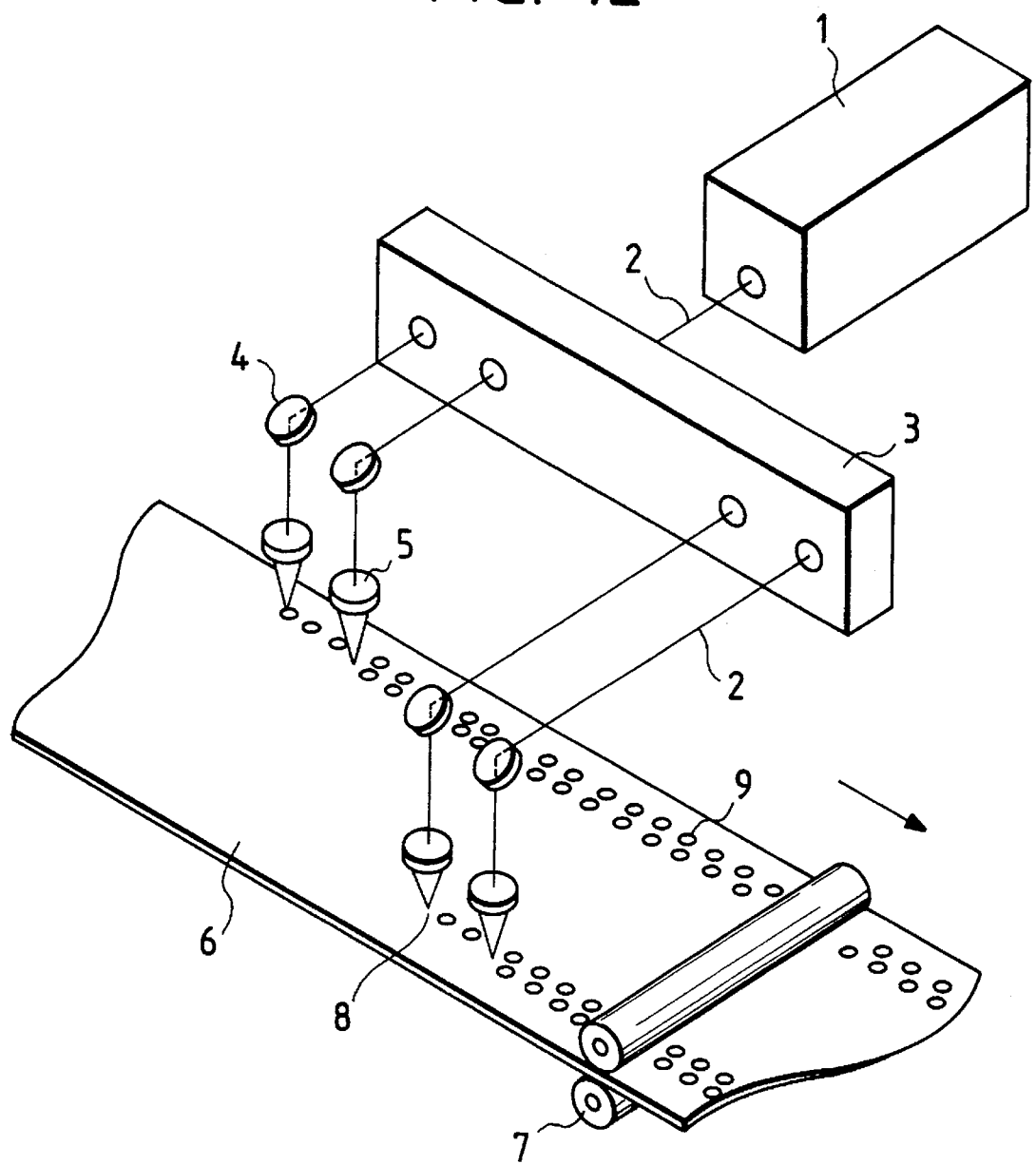
FIG. 12 is an arrangement diagram illustrating a laser hole-making apparatus known in the art.
Figure 13:
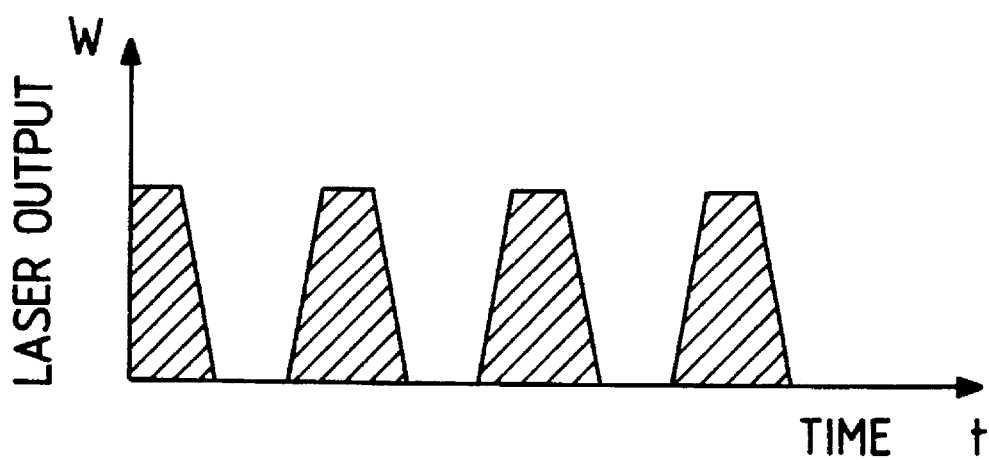
FIG. 13 illustrates a relationship between pulse laser beam time and laser output.
Figure 15:
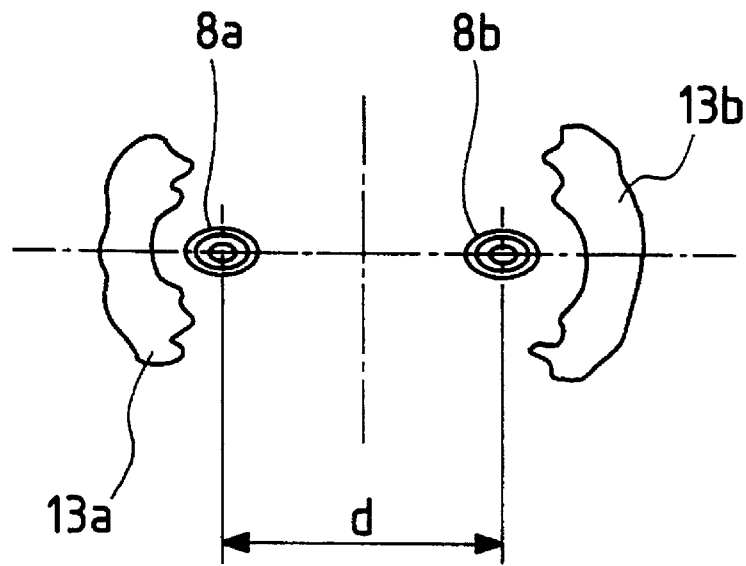
FIG. 15 illustrates how the single-mode laser beam is split by a two-beam-splitting prism lens.
Figure 14A:
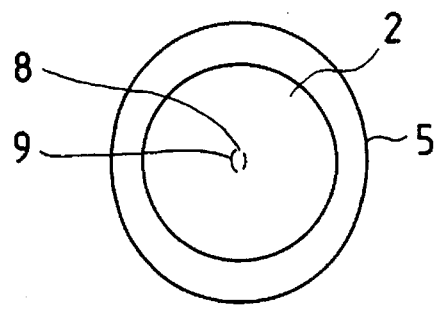
FIGS. 14a and 14b comprise a beam-condensing status diagram of a laser beam in a single mode in the conventional apparatus.
Figure 14B:
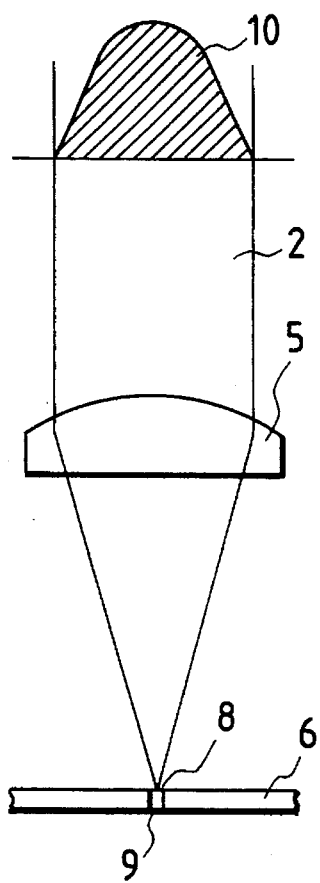

FIG. 10 is an arrangement diagram of a pulsed laser oscillator which is an embodiment of the present invention, and FIG. 11 is a sectional view taken at a right angle to an optical axis in FIG. 10. Referring to these drawings, 27a, 27b, indicate a pair of discharge electrodes provided in a vertical direction, and 28 designates arrows which show a direction in which a laser gas including a $CO_2$ gas flows between the pair of discharge electrodes 27a and 27b. 29 indicates a partial reflector and 30 denotes a total reflector, between which the laser beam is excited and amplified and the pulse laser beam 2 is then output from the partial reflector 29. As is clear from the above description, the three axes in the discharge exciting direction (vertical) of pulse oscillation, the laser gas flowing direction and the laser oscillating direction are designed to be orthogonal to each other. It is known in the art that this system is advantageous to the increased output of the oscillator. Particular advantages of this system are that laser photons of high oscillation density are prone to exist in the vicinity of the discharge electrodes 27a, 27b which perform discharge and excitation, that two energy distribution peaks are liable to exist nearer to the electrodes than to the optical axis as shown in FIG. 11, and that the generation of energy distribution 12 in the $TEM_{01}$-mode improves the efficiency of oscillatory operation of the pulse laser beam.

In a fast axial flow laser oscillator (not shown) whose laser gas flowing direction and laser oscillating direction are designed to be the same, a laser beam whose laser mode is axially symmetrical about an axis (to be radial) is easily generated and, it is especially advantageous to employ the distribution type as shown in FIG. 4.

The present invention is not limited to the laser cutting apparatus which makes holes in a traveling band-shaped material with a pulse laser beam as described in the several embodiments, and may be utilized for welding, marking, etc. using a continuous laser beam.

Also, it will be apparent that a workpiece is not limited to the band-shaped material and a stationary workpiece may be cut with beam-condensed spots moving or kept stationary. Further, the beam-splitting elements are not limited to the optical prisms as employed in said embodiments and beam splitting may be done by another method, e.g., optical fiber.

What is claimed is:

1. A laser machining apparatus for making holes in a workpiece with a laser beam, comprising:

a laser oscillator outputting the laser beam in an energy distribution mode having a plurality of peaks;

beam condensing elements for condensing the laser beam; and beam splitting elements having a plurality of cut surfaces and being disposed so that each one of the plurality of peaks of the laser beam impinge on a respective one of the cut surfaces to produce a plurality of beam condensed spots on the workpiece for making a plurality of holes in the workpiece.

2. The laser machining apparatus as defined in claim 1, further comprising:

moving means for moving the workpiece relative to the beam-condensed spots.

3. The laser machining apparatus as defined in claim 2, wherein:

at least one of said beam splitting elements comprises a reflection element for changing an advancing direction of the laser beam.

4. The laser machining apparatus as defined in claim 2, wherein:

said beam splitting elements comprise prism lenses having a prism cut surface side with an outer peripheral portion, said outer peripheral portion being machined to a surface configuration axially symmetrical about an optical axis of the lenses.

5. The laser machining apparatus as defined in claim 4, wherein:

the outer peripheral portion is orthogonal to the optical axis.

6. The laser machining apparatus as defined in claim 2, wherein:

at least one of said beam condensing elements comprises a reflection element for changing an advancing direction of the laser beam.

7. The laser machining apparatus as defined in claim 1, wherein:

at least one of said beam splitting elements comprises a reflection element for changing an advancing direction of the laser beam.

8. The laser machining apparatus as defined in claim 7, wherein:

said beam splitting elements comprise prism lenses having a prism cut surface side with an outer peripheral portion, said outer peripheral portion being machined to a surface configuration axially symmetrical about an optical axis of the lenses.

9. The laser machining apparatus as defined in claim 8, wherein:

the outer peripheral portion is orthogonal to the optical axis.

10. The laser machining apparatus as defined in claim 1, wherein:

said beam splitting elements comprise prism lenses having a prism cut surface side with an outer peripheral portion, said outer peripheral portion being machined to a surface configuration axially symmetrical about an optical axis of the lenses.

11. The laser machining apparatus as defined in claim 10, wherein:

the outer peripheral portion is orthogonal to the optical axis.

12. The laser machining apparatus as defined in claim 1, wherein:

said laser oscillator is a three axis orthogonal oscillator, and wherein a discharge exciting direction, a laser medium flowing direction and a laser oscillating direction are orthogonal to each other and have a laser beam energy distribution mode with a plurality of peaks.

13. The laser machining apparatus as defined in claim 1, wherein said laser oscillator is a fast axial flow laser oscillator which generates a laser beam whose energy distribution of laser mode has a plurality of peaks.

14. The laser machining apparatus as defined in claim 1 further comprising moving means for moving the beam condensed spots relative to said workpiece.

15. The laser machining apparatus as defined in claim 14, wherein:

at least one of said beam splitting elements comprises a reflection element for changing an advancing direction of the laser beam.

16. The laser machining apparatus as defined in claim 14, wherein:

at least one of said beam condensing elements comprises a reflection element for changing an advancing direction of the laser beam.

17. The laser machining apparatus as defined in claim 1, wherein the plurality of beam condensed spots are equal in number to the plurality of cut surfaces and equal in number to the plurality of holes.

18. The laser machining apparatus as defined in claim 1, wherein:

the energy distribution mode is a $TEM_{01}$ mode or greater.

19. The laser machining apparatus as defined in claim 1 wherein:

at least one of said beam condensing elements comprises a reflection element for changing an advancing direction of the laser beam.

20. A laser machining apparatus for simultaneously machining a workpiece in a plurality of locations with energy from a single laser beam, comprising:

a laser oscillator outputting a first laser beam in an energy distribution mode having a plurality of energy distribution peaks;

beam splitting means for dividing said first laser beam into a plurality of second laser beams, each one of said plurality of second laser beams corresponding to a respective one of said plurality of energy distribution peaks; and condenser means for concentrating said second laser beams for producing a plurality of beam condensed spots on the workpiece.

21. The apparatus of claim 20, wherein said condenser means comprises a Fresnel lens.

22. The apparatus of claim 20, wherein said condenser means comprises a meniscus lens.

23. The apparatus of claim 20, wherein each of said condenser means and said beam splitting means are integrated into a single structure.

24. The apparatus of claim 20, wherein said condenser means said beam-splitting means are separated structures.

25. The apparatus of claim 20, wherein said beam-splitting means is a multi beam splitting prism lens.

26. The laser machining apparatus as defined in claim 20, wherein:

the energy distribution mode is a $TEM_{01}$ mode or greater.

27. A laser machining apparatus for simultaneously machining a workpiece in a plurality of locations with energy from a single laser beam, comprising:

a laser oscillator outputting a first laser beam in an energy distribution mode having a plurality of energy distribution peaks;

condenser means for concentrating said first laser beam; and beam splitting means for dividing said concentrated first laser beam into a plurality of second laser beams, each one of said plurality of second laser beams corresponding to a respective one of said plurality of energy distribution peaks, and for producing a plurality of beam condensed spots on the workpiece.

28. The apparatus of claim 27, wherein said condenser means comprises a Fresnel lens.

29. The apparatus of claim 27, wherein said condenser means comprises a meniscus lens.

30. The apparatus of claim 27, wherein each of said condenser means and said beam-splitting means are integrated into a single structure.

31. The apparatus of claim 27, wherein said condenser means and said beam-splitting means are separated structures.

32. The apparatus of claim 27, wherein said beam-splitting means is a multi beam splitting prism lens.

33. The laser machining apparatus as defined in claim 27, wherein:

the energy distribution mode is a $TEM_{01}$ mode or greater.

34. A method of laser machining for concurrently machining a workpiece in a plurality of locations using energy from a single laser, comprising:

generating a first laser beam having an energy distribution mode with a plurality of energy distribution peaks;

splitting the first laser beam into a plurality of second laser beams, each one of said plurality of second laser beams corresponding to a respective one of said plurality of energy distribution peaks; and directing concentrated ones of said second laser beams onto the workpiece as beam condensed spots for machining.

35. The method of laser machining as set forth in claim 34, further a step of concentrating said second laser beams after said splitting step.

36. The method of laser machining as set forth in claim 35, wherein said concentrating step is conducted by one of transmitting and reflecting said second laser beams.

37. The method of laser machining as set forth in claim 34, further comprising concentrating said first beam before said splitting step.

38. The method of laser machining as defined in claim 34, further comprising:

moving the workpiece relative to the beam condensed spots.

39. The method of laser machining as set forth in claim 34, wherein said splitting step is conducted by one of transmitting and reflecting said second laser beams.

40. The method of laser machining defined in claim 34, further comprising:

moving the beam condensed spots relative to the workpiece.

41. The laser machining apparatus as defined in claim 34, wherein:

the energy distribution mode is a $TEM_{01}$ mode or greater.

* * * * *